United States Patent Office 3,304,480
Patented Feb. 14, 1967

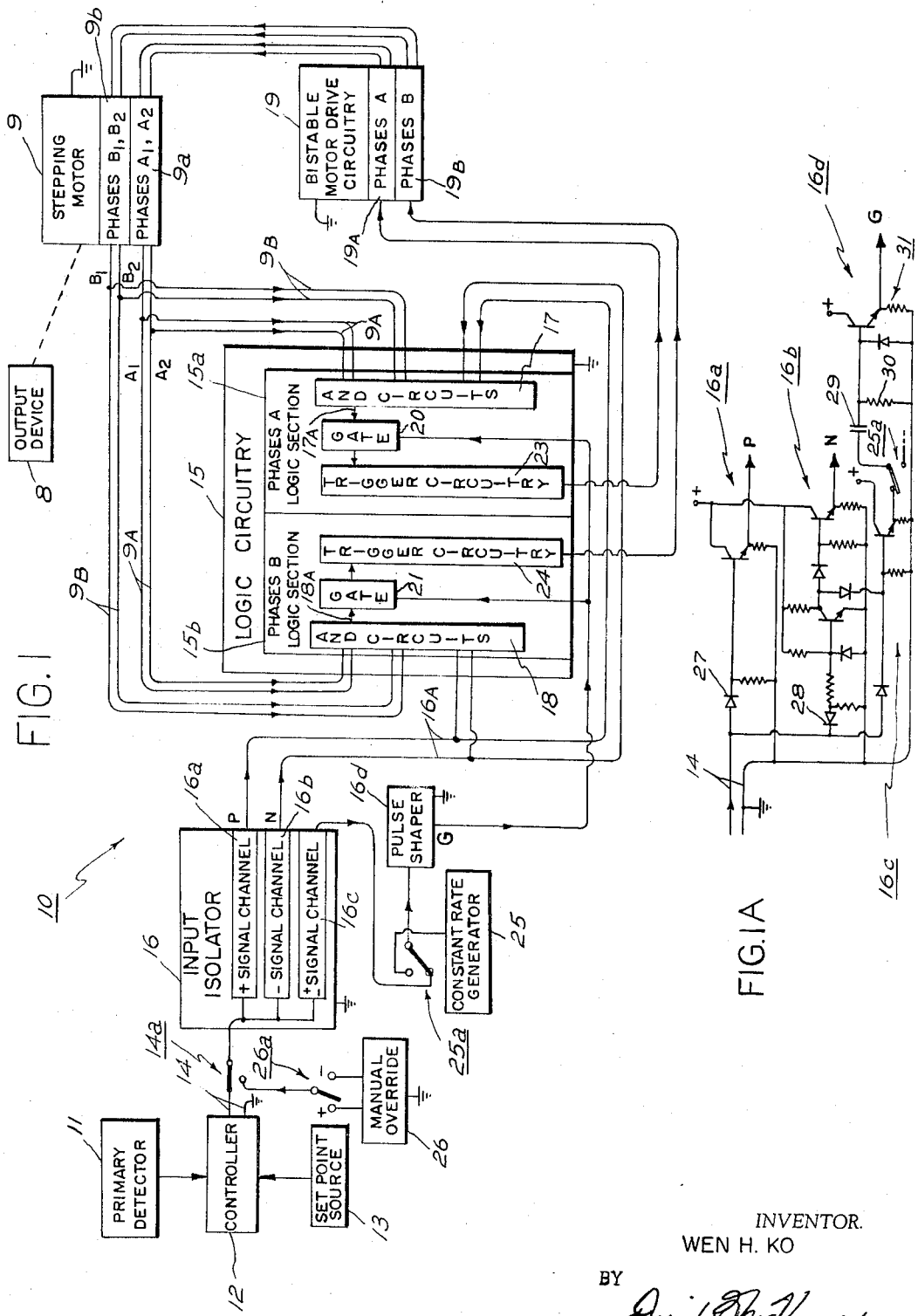

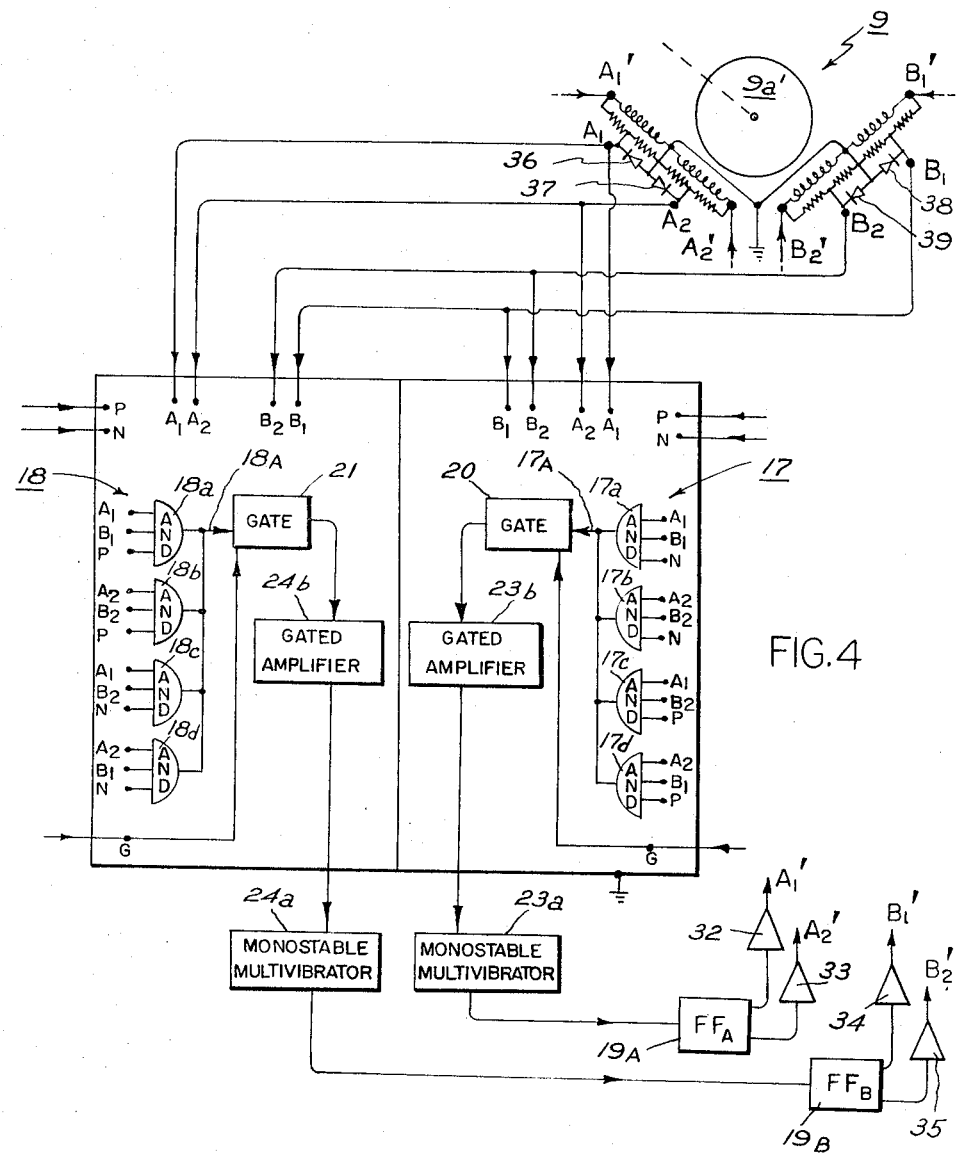

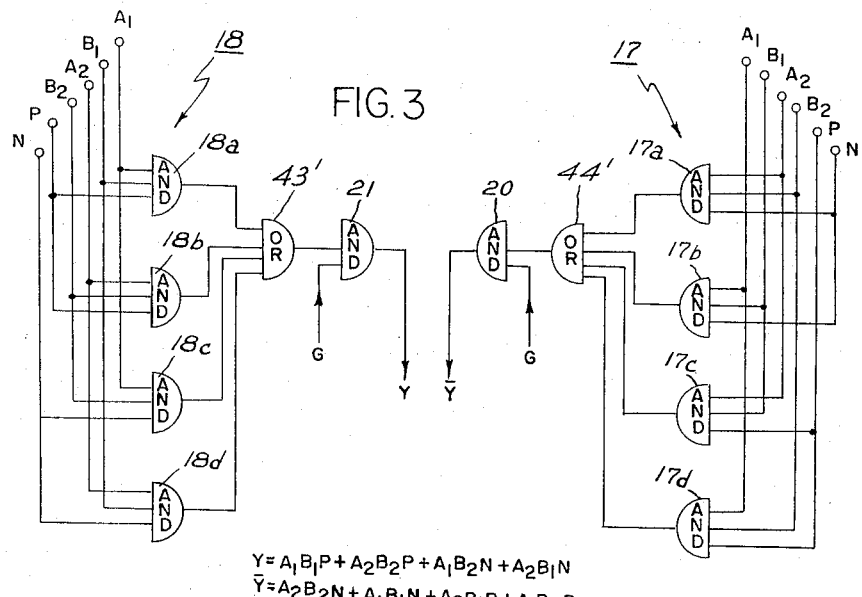
$Y = A_1B_1P + A_2B_2P + A_1B_2N + A_2B_1N$
$\bar{Y} = A_2B_2N + A_1B_1N + A_2B_1P + A_1B_2P$
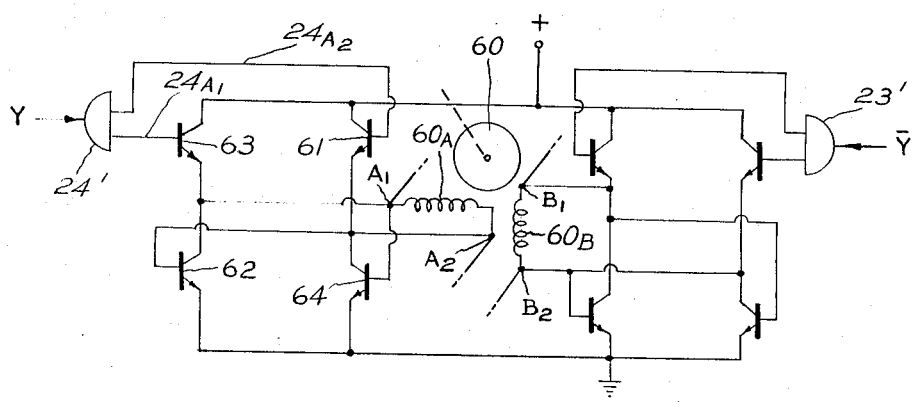
FIG. 7

3,304,480
DIGITAL ACTUATOR INCLUDING FEEDBACK REPRESENTATION OF THE STEPPER MOTOR WINDING ENERGIZATION STATE
Wen H. Ko, Cleveland Heights, Ohio, assignor to Conoflow Corporation, Philadelphia, Pa., a corporation of Pennsylvania
Filed May 16, 1963, Ser. No. 280,966
20 Claims. (Cl. 318—138)

The present invention relates to improvements in electronic control of stepping motors and, in one particular aspect, to novel and improved digital actuators which are capable of operating at high speeds without confusion or accumulation of errors, under control of unique digital logic circuitry which recognizes motor feedback data.

Advances in digital computer technology have created demand for motors or actuators which will directly follow rapidly-changing electrical outputs in digital form, without requiring digital-to-analog conversions and without involving the costs, complexities, lags and errors commonly associated with analog servo motor loops. In addition, there are numerous other applications for controlled electric actuators, such as those of the stepping motor type, which would be promoted if precision could be maintained at high operating speeds. As is well known, the so-called "stepping" motor is a highly attractive type of high-torque motive device which tends to hold itself in a locked condition or to move in one or an opposite angular direction only by minute and discrete angular steps or increments. However, such motors can be exploited properly only if their windings are energized strictly in accordance with a predetermined switching sequence, and high-speed operation of these motors can be realized only when the switching is under control of electronic devices, such as transistors. Although transistorized flip-flop circuits have heretofore been arrayed in systems intended to translate input pulses into related motor actuations, the possibilities of motor confusion and of accumulation of errors have not to my knowledge been successfully overcome in relatively simple, fast-response equipment lending itself to low-cost manufacture. Digital actuators constructed in accordance with the present teachings are of the latter type, and these afford substantially errorless operation primarily as a consequence of continuous electrical feedback, in digital form, from the motor windings. In this operation, unique logic circuitry of uncomplicated construction responds both to each digital input pulse and to the digital feedback data to render a decision and to issue a command.

It is one of the objects of the present invention, therefore, to provide novel and improved digital actuator equipment having high-speed operating capabilities and unique provisions for avoiding errors and accumulations of errors.

A further object is to provide electronically-controlled stepping motors which operate with minimized error to translate electrical digital input data into faithfully-related positional outputs of the motor with high resolution accuracy.

Another object is to provide digital actuation equipment including unique logic circuitry which exercises improved dynamic control over motor operation.

Still further it is an object to provide a logic-controlled stepping motor arrangement in which false actuations are inhibited and in which confusions and accumulations of error are avoided through protective feedback effected through a logic network.

By way of a summary account of practice of this invention in one of its aspects, a conventional type of rotatable electric stepping motor is utilized as an end device which is to produce mechanical output movements in response to commands of electrical pulses from input circuitry. Windings of the stepping motor are effective to advance the rotor structure by one incremental angular amount in one or the other direction under control of bistable multivibrators (flip-flops). The latter cause the needed switching of D.-C. motor excitations in response to each incoming pulse from the input circuitry, with polarities of the incoming pulses determining the directions of angular movement. However, before any motor actuation is permitted to occur in response to each input pulse, a unique logic network decides in which of the two possible directions the motor should take a single step, the decision being made according to a simple mathematical formulation. For this purpose, the logic network not only recognizes the polarity of the input pulse but also recognizes, with the aid of special feedback, in which of its sequentially-ordered conditions of excitation the motor is being held at any time when a decision is required. Logic-network decisions are reached through the selections offered by common gating units, these being preferably in the form of banks of "And" circuits connected and energized in accordance with a predetermined coding. Erroneous responses are suppressed by actions of auxiliary gating and delay elements of the system.

The subject matter regarded as my invention is particularly pointed out and distinctly claimed in the concluding portion of this specification. However, both as to preferred practices and constructions, and further in relation to objects and advantages thereof, this invention may best be understood through reference to the following description taken in connection with the accompanying drawings, wherein:

FIGURE 1 is a block diagram of a control system in which the present improvements in digital actuations are exploited;

FIGURE 1A is a schematic diagram of the input portion of the circuitry of FIGURE 1;

Figure 5:
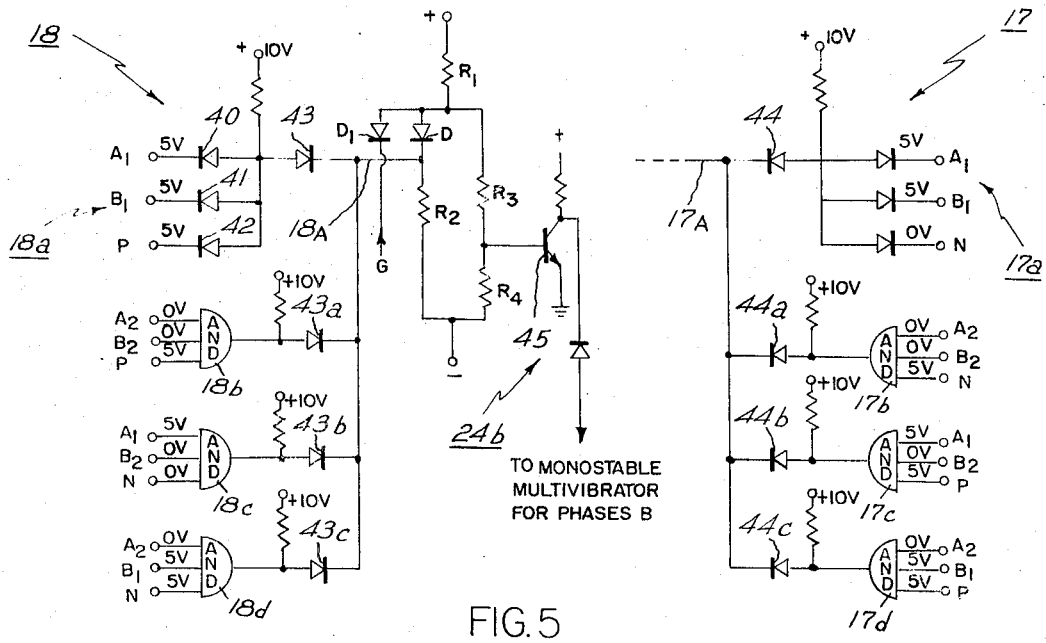
Figure 6:
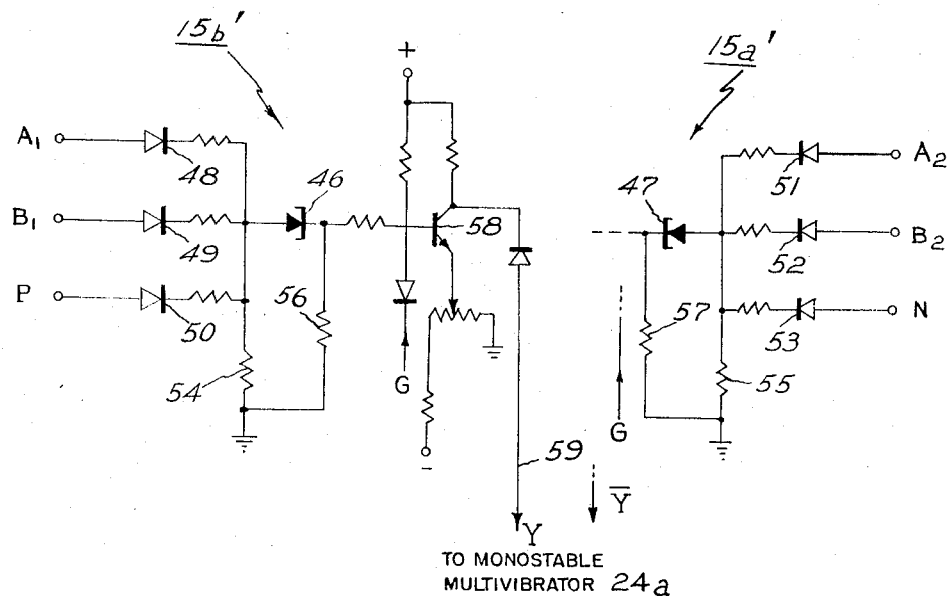
Figure 8:
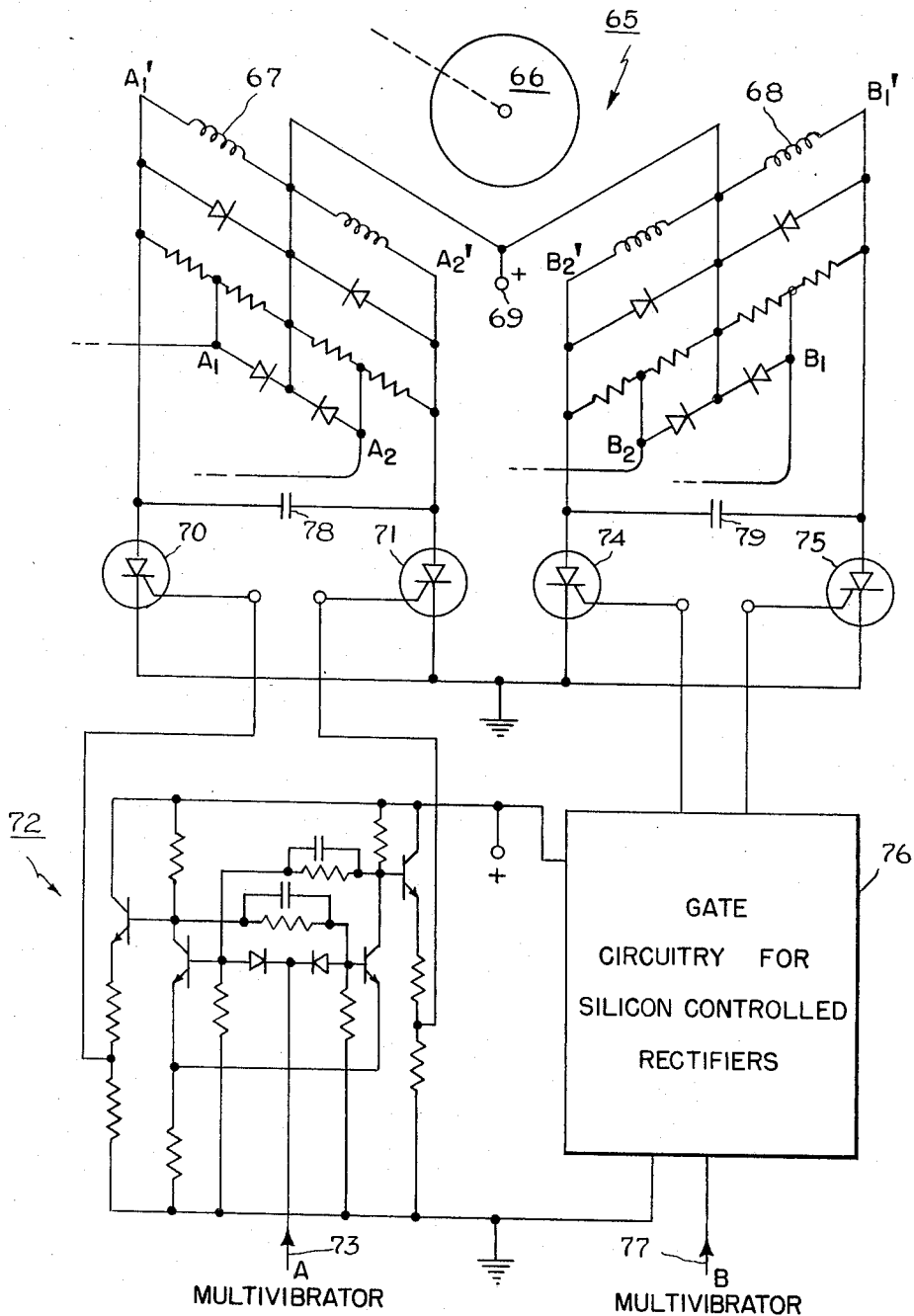

FIGURE 2 comprises a tabulation showing a pattern for the changes in excitation of a typical stepping motor useful in practice of this invention;

FIGURE 3 represents a simplified symbolic diagram of an improved logic circuit for precise control of stepping motors, together with the applicable Boolean algebraic expressions of its logic function;

FIGURE 4 illustrates in block and schematic form details of an improved motor-controlling logic network such as that in the system of FIGURE 1;

FIGURE 5 is a schematic diagram of one preferred solid-state embodiment of portions of the logic networks of FIGURES 1, 3 and 4;

FIGURE 6 provides a schematic diagram of an alternative motor-control network in which tunnel diodes are used to simplify the logic circuitry;

FIGURE 7 depicts control circuitry for a four-wire stepping motor, the showings being partly in schematic and block styles; and FIGURE 8 illustrates in schematic and block form details of a silicon controlled rectifier arrangement for driving a stepping motor in accordance with the dictates of an improved logic network.

In the control system portrayed in FIGURE 1, an output device 8, which may comprise a flow-regulating valve or another comparable industrial control device, is mechanically powered by an electrical stepping motor 9 of a digital actuator 10. As is well understood in the art, stepping motors are highly attractive motive devices because their discrete incremental movements afford a means for realizing very great precision, while at the same time they produce advantageously large locking and operating torques. The condition of the controlled variable is sensed by the primary detector 11, which may comprise a common form of industrial transducer such as a flow-meter in the flow-regulated line. A suitable controller 12 receives this information in electrical form, and compares it to the electrical signals from a set point source 13. The controller 12 then delivers electrical outputs for command of the digital actuator 10. An elementary servo system of this character can exploit a simple difference amplifier in the role of the controller 12, whereby electrical output signals from the primary detector can be compared with the fixed or variably-programmed signals from source 13 and will result in appearance of one or another polarity (or phase) of electrical output across lines 14. In other instances, the controller may be in the form of a more complex computer, such as a digital computer which delivers pulses of one or another polarity to lines 14. Digital actuator 10 in turn is sensitive to the polarities of command signals applied to it by the controller, and is adapted to excite the stepping motor 9 into a predetermined incremental stepping movement in one or another angular direction each time an input pulse is received. Depending upon the types of primary detectors, controllers and set point sources which are used in the system, the digital actuator may be excited by input pulses occurring at fixed or variable rates to promote known servo system operating characteristics; the present invention does not center about such system features, however.

It is an important aspect of the digital actuator function that it responds to each and every electrical input pulse which is applied to it, in each instance arriving at an independent decision as to whether the associated stepping motor ought to be moved one discrete step forward or backward from its then-current position. This is true irrespective of the pulse periodicities or of the number of times pulses of the same polarity succeed one another, and its purpose is to avoid accumulations of errors due to transient malfunctioning. To achieve this end, while permitting the actuator to operate at the very high speeds required in many applications, unique electronic logic is exploited. The circuitry 15 utilized in supporting necessary logic functions is in two sections, 15a and 15b, which are substantially identical and each of which is associated with the different connections of the phase windings of 9a and 9b (phases A and B) of the particular type of stepping motor, 9, chosen for the system disclosed in FIGURE 1. Two connections are designated in relation to each of the phase windings A and B, such that a predetermined excitation voltage may be sensed at one or the other of contacts $A_1$ and $A_2$ of motor phases A, and a predetermined excitation voltage may also be sensed at one or the other of contacts $B_1$ and $B_2$ of motor phases B, at any instant. For the moment, it suffices to note here that these excitation signals must change according to a predetermined pattern for the stepping motor rotor to take successive steps, in one or another direction; these excitation signals are independently applied as inputs to both of logic sections 15a and 15b, via the two pairs of motor feedback lines 9A and 9B. Two additional input signals are applied to each of the two logic sections 15a and 15b, from the separate pair of channels 16a and 16b of an input isolator 16, the respective output coupling leads in line 16A being labelled P and N to characterize the fact that they exhibit output signals only when the inputs to isolator 16 are positive and negative, respectively. Each logic section is thus connected to receive electrical signals from three different pairs of input lines (P and N, $A_1$ and $A_2$, and $B_1$ and $B_2$); and it is important to note that the signals from each line are binary in character (either "ON" at a predetermined voltage level, or "OFF") and that only one of each pair of lines can be in the "ON" state at any instant. This is clear once it is understood that the isolator 16 can only produce either a P or N output, indicating that its incoming signal is either positive or negative, but not both at any given moment. And, because each of the two field windings of the stepping motor is of a bifilar construction wherein excitation is switched between ends of its opposite halves, it is true that only one connection in each of the pairs of connections $A_1$–$A_2$ and $B_1$–$B_2$ can be excited at any time. All the signals which do appear in the lines 9A, 9B and 16A are of but one polarity, which is positive in the example under discussion.

In response to a change in condition in the input signals applied to it, logic circuitry 15 is required to switch excitation from one of the bifilar windings halves to the other. While this involves but a single switching operation, the logic circuitry must first decide in which of the two motor phases (A and B) this switching should take place; this decision is based upon the command of the input signal in line 14, and upon the condition of stepping motor excitation which already exists at that time, and upon which of the two possible changes from the existing condition of excitation will satisfy the command of the input signal. Inasmuch as the stepping motor excitations across its four switched connections follow a simple order, a single step in one or the other angular direction from any given position involves merely a change from one to the other of the connections in one of the two pairs of connections. A fragment of a typical pattern or sequence of steps, in terms of the excited phase connections for a stepping motor such as motor 9, is shown in FIGURE 2; those skilled in the art will understand that this sequence is repeated many times in the course of but a single full revolution of the known type of stepping motor. Boolean algebraic treatment of all of these data demonstrates that there are eight possible combinations of three bits of information which must be considered for the logic circuit to arrive at the correct decision in any situation, and that these combinations can be isolated into two different groups of four to characterize the sense of the decision, as follows:

$$Y = A_1B_1P + A_2B_2P + A_1B_2N + A_2B_1N$$
$$\overline{Y} = A_2B_2N + A_1B_1N + A_2B_1P + A_1B_2P$$

These Boolean functions convey symbolic logic which is translated to mean: Y, that change in excitation of motor phases B (FIGURE 1) is called for when any one of the terms $A_1B_1P$, $A_2B_2P$, $A_1B_2N$ and $A_2B_1N$ is satisfied; and, $\overline{Y}$, that a change in excitation of motor phases A (FIGURE 1) is called for when any one of the terms $A_2B_2N$, $A_1B_1N$, $A_2B_1P$ and $A_1B_2P$ is satisfied. With reference to the FIGURE 1 system, one, and only one, of the eight terms can be satisfied at any instant, and this by simultaneous appearance of predetermined voltages at the corresponding connections (i.e., at three of the connections $A_1$, $A_2$, $B_1$, $B_2$ P and N). Execution of this logic involves application of all the electrical voltages at these connections to both the "And" circuits, 17 and 18, of logic sections 15a and 15b. As shown in the FIGURES 3, 4 and 5 representations of such logic circuitry, the "And" circuits 17 and 18 are each in fact composed of four "And" units (17a–17d and 18a–18d), each of these "And" units being wired into circuit with three of the eight possible voltage connections, in a distinctive combination. The distinctive electrical circuit connections to the four "And" units 17a–17d are thus seen to correspond to the four terms of the expression $\overline{Y}$, above, and the distinctive connections to the four "And" units 18a–18d likewise correspond to the four terms of the expression Y above.

It is characteristic of the "And" units that they will exhibit a high voltage at their common junction only when all of the electrical input voltages are high. If any one or more of the three inputs to an "And" unit is low (or zero, in the case under consideration) it cannot occasion a high voltage at the common junction (17A or 18A) for its bank of "And" units (17 or 18, respectively). Therefore, when any three of the applied voltages are all high, a corresponding high voltage output appears only in one of the junctions 17A or 18A, signaling that either the expression $\overline{Y}$ or Y, respectively, is satisfied. This signalling is then utilized to switch the electrical excitation in the corresponding one of the stepping motor winding phases (phases A or B, respectively). Such switching is conveniently performed by known bistable motor drive circuitry 19 (FIGURE 1) the two sections 19A and 19B of which are preferably in the form of transistorized flip-flops. The corresponding flip-flops $FF_A$ and $FF_B$ in FIGURE 4 are typical of those which will function to alternate the excitations of connections in each of motor phases A and B, respectively. While the flip-flops 19A and 19B may be actuated directly by the high voltage pulses appearing at the output junctions 17A and 18A respectively, of the two banks of "And" units, 17 and 18, it is preferred instead that a gating action first be introduced, by way of the gates 20 and 21. These gates are responsive not only to the voltages at junctions 17A and 18A, respectively, but also to an additional gating signal, appearing in both connections G; no output can be delivered to trigger either of the flip-flops 19A and 19B unless the gating signal is present. Positive gating pulses are furnished to gating line G by a pulse shaper 16d, which is responsive to each input pulse delivered to the input channel 16c of the digital actuator over input line 14, irrespective of its polarity. Preferably, a sharp peaked pulse is derived and furnished to gating line G, this pulse arriving at the gates 21 and 22 at a time when one of them also witnesses a signal from one of the "And" output lines 17A and 18A. The gate which is excited from both of these sources passes an output signal to its associated trigger circuitry, 23 or 24. By this gating action, it is assured that the output signals to the trigger circuitry will be short and peaked in the manner of the pulse appearing in gating line G, rather than having irregular leading edges and relatively long durations, as might otherwise be the case. "And" circuits 20 and 21 in the functional diagram of FIGURE 3 correspond to the gates in FIGURES 1 and 4. A preferred form for each unit of trigger circuitry 23 and 24 involves a monostable vibrator, 23a and 24a, respectively, these being shown in FIGURE 4 following the respective gated amplifiers 23b and 24b. Once one of these known types of monostable multivibrators (i.e. one-shot multivibrators) is triggered into operation by a pulse from its associated gate and gated amplifier, it takes a predetermined time to complete its one cycle of operation. During this time, the multivibrator is locked into its cycle of operation and is insensitive to any further input signals, such that it will not respond falsely to jitter or like irregularities in any of the input or other system signals. This delay and locking feature is an important one, in that it suppresses errors and, in particular, prevents actuations of the stepping motor at a multiple of the intended speed. Operating delay in each of the monostable multivibrators insures that, by the time the resulting motor stepping occurs, the gating pulse to which it responded will have disappeared in the logic circuitry and thus cannot falsely command another step, as could be the tendency otherwise. The "time constant" of the both monostable multivibrators is thus made greater than the durations of the gating pulses in line G.

The system of FIGURE 1 is also arranged to respond to manual control, for a temporary "override" of automatic control, for example. It is for this purpose that the constant rate generator 25 is added, together with the manual override source of D.-C. voltage 26 and the switches 25a and 26a. When switch 26a is manually closed, it applies either a positive or negative D.-C. voltage, selectably, from source 26 to the input lines 14 of the digital actuator via switch 14a, provided the latter is closed in the "manual" switching condition which is opposite to the "automatic" switching condition shown. The positive input voltage from source 26 is intended to command stepping motor actuations in one angular direction, while a negative voltage is to cause motor operation in the reverse direction. Input isolator 16 responds by producing either an N or P output to the logic circuitry 15, depending upon the polarity of the input, although this is not alone sufficient to produce the succession of pulses required for continuous operation of the stepping motor. The pulse generator 25 may also be switched into the gating circuitry, by closure of switch 25a to the "D.C." switching condition opposite to the "Pulse" switching condition shown in FIGURE 1, and this generator introduces a succession of short electrical pulses, preferably at a predetermined repetition rate. These pulses, which may be developed by a free-running multivibrator or by clipping of signals from an A.-C. supply, or the like, appear in line G and, in the presence of suitable outputs from the "And" circuits, serve to gate the appropriate logic section as required for excitation of the appropriate motor winding phases.

Four advantageous types of control of the stepping motor may be exercised by way of the switches 14a, 25a and 26a. First, when switch 14a is closed as shown, in its "automatic" condition, and when switch 25a is also closed as shown, in its "Pulse" condition, each input pulse applied by the controller 12 will cause the stepping motor to take one discrete step. Second, if the condition of switch 25a is then changed, to its "D.C." condition, the stepping motor will step at a constant rate, determined by the pulse repetition rate of generator 25, but only so long as an input is also received by input leads 14. Third, if the condition of switch 14a is then changed to the "manual" condition, opposite to that shown, actuation of switch 26a to closure with the positive (+) terminal of the manual override 26 will result in the motor being stepped at the rate set by the constant rate generator 25 so long as the switch 26a continues to be held closed. This is a manual "slewing" operation of the digital actuator. Fourth, with switch 14a in the last-mentioned "manual" condition of closure, and with switch 25a in the illustrated "Pulse" condition of closure, actuation of switch 26a to the positive terminal of override 26 will cause the motor to take but a single step, regardless of how long the switch 26a continues to be held closed. Release (opening) of switch 26a, followed by another such closure, will cause the motor to take one more step, and so on. This deliberate operation lends itself to careful control or "manual inching."

In a typical system operation, the primary detector 11 senses a condition which is to be corrected or followed, as, for example, the rate of flow of a fluid substance in a controlled process. Comparison of the output of the primary detector with the value or values set or programmed in the set point source 13 results in delivery of an electrical output signal to line 14 by the controller 12. At this point, the electrical signals in line 14 characterize what the condition of the output device 8 should be, and this information must be translated into action by the stepping motor 9 to move the output devices to the desired condition. In the system under consideration, for example, output device 8 may comprise a fluid valve controlling the rate of fluid flow being monitored by detector 11, and so long as the rate of flow is less than that prescribed by the controller the motor should be stepped in one direction to open the valve, and vice versa. Polarities of the electrical signals applied to line 14 characterize the angular direction in which the stepping motor should move and, hence, the direction in which the output valve should be turned (i.e. toward or away from closure). It should be understood that these electrical signals are in pulse form, and that they may occur at very high repetition rates, such as 200 pulses per second. The controller may produce pulses directly, or its unvarying unidirectional output signals may be interrupted to convert them into pulse form, or, as in the case of the aforementioned manual override, the gating may be at a predetermined rate under control of a separate generator, making it unnecessary that the inputs from line 14 initially be in pulse form.

As has been noted earlier herein, while the different polarities of input signals to the digital actuator characterize the desired different directions of stepping motor movement, the logic circuitry 15 requires inputs which are all of the same polarity (positive). These input signals to the logic circuitry must also be isolated, such that those, P, responsive to positive signals in line 14 will appear in a line separate from that carrying those, N, responsive to negative signals in line 14. Signal channels 16a and 16b achieve such isolation and, as detailed in FIGURE 1A, these channels may simply comprise one and two stages of transistor amplifiers, with the different input diodes 27 and 28 thereof blocking the pulses of unwanted polarities in each channel. Both channels 16a and 16b terminate in a cathode-follower stage, which provides a suitably matched output to the "And" units of the logic circuitry 15, although channel 16b includes one additional amplifier stage to ascertain that the channel outputs will be positive for negative inputs. Channel 16c is similarly terminated and delivers positive pulses to the pulse shaper circuitry 16d each time either a positive or negative pulse appears in line 14. Pulse shaping is achieved by the peaking effects of the R-C differentiating circuit including capacitance 29 and resistance 30, which precede the cathode-follower output stage 31.

The drive circuitry 19 of stepping motor 9 will not respond directly to the pulses N and P in a precise and predictable fashion. Inspection of the four-step sequence of excitations tabulated in FIGURE 2 explains why this is so. If, for example, the motor is in the 3rd step and an incoming positive pulse signals a change of its A-phase excitation, it will move clockwise to the 4th step. However, the same pulse applied when the motor is in its 2nd step would cause the motor to turn counterclockwise, to the 1st step. Successive positive pulses would merely move the rotor back and forth one step at a time. The motor drive circuitry thus can operate the motor in the proper angular directions and by the proper amounts responsive to successive pulses of one sense only when the phase excitations are carefully alternated after once commencing with the correct phase change. Although stepping motor control thus tends to be a somewhat complex matter, the stepping motor is nevertheless a most attractive and useful form of motive device. In particular, the rotors of such motors can be moved predictably through very small angular increments, or through very large angles, depending upon the number of control pulses which are applied; very sizable torques can be realized during movements even at high stepping speeds, and desirably high stopping and locking torques are developed promptly after the control pulses cease. Precision motors having such characteristics thus can often be used without costly and cumbersome gearing heretofore thought to be essential in many applications. However, some form of logical decision must obviously be made concerning changes in motor excitations if the resulting motor movements are not to be erroneous. In accordance with the present teachings, a decision is reached by circuitry 15 before every motor step is executed, the aforementioned Boolean functions determining the groupings of logic circuit input signals $A_1$, $A_2$, $B_1$, $B_2$, P and N. An important aspect of this improved logic control in the digital actuator is found in the fact that there is continuous feedback of data concerning motor excitations, via the connections $A_1$, $A_2$, $B_1$ and $B_2$. Each incoming P or N signal (respectively representing a positive or negative signal appearing in input line 14) effects an electronic flip-flop switching of excitation of motor phases A or B, depending upon what the then-current state of motor excitation happens to be. Once a step is taken, the feedback data concerning motor excitation changes automatically also, and a subsequent P or N pulse is routed to the proper flip-flop circuitry in accordance with the new logic which then applies. Gating pulses in line G control the logic circuit operations to prevent its response to spurious signals in the P or N channels or to spurious outputs of the "And" units resulting from other causes.

Details of a preferred practice for obtaining feedback signals of a predetermined level from the stepping motor windings are included in the FIGURE 4 circuitry. There, the stepping motor 9 corresponds to that illustrated in FIGURE 1 and possesses a rotor $9a'$ and two field windings. Each of the field windings is of the bifilar type, with the central junctions of both coils in each of the two windings being grounded. Ends $A_1'$ and $A_2'$ of the phase A winding are switched in their excitations through transistorized power amplifiers 32 and 33 by the transistorized flip-flop stage 19A ($FF_A$), and ends $B_1'$ and $B_2'$ of the phase B winding are switched in their excitations through power amplifiers 34 and 35 by the other flip-flop stage 19B ($FF_B$). Inasmuch as the levels of operating voltage across these windings may be relatively high in comparison with the levels of voltages desired at the inputs to each of the "And" units (17a–17d and 18a–18d), voltage-dividing resistance networks are connected across each of the bifilar windings and are tapped to deliver the desired lower feedback voltages at points $A_1$, $A_2$, $B_1$ and $B_2$. Diodes 36–39, connected one each across these same points and ground, are polarized to pass pulses of unwanted ringing-type signals induced by the rapid flux changes in the phase windings and, thereby, to suppress spurious operations of the logic circuitry. Such diode damping is a safeguard against the generation of erroneous signals in the logic circuitry, which signals could otherwise tend to command false steps of the motor.

The schematic representations in FIGURE 5 typify the elementary solid state circuitry which may be utilized in forming a suitable logic network. By way of example, the "And" unit 18a is shown in a known form involving three diodes 40–42, the common junction of which exhibits a high voltage only because all the input voltages ($A_1$, $B_1$ and P) are high (5 volts, according to the operating characteristics designated on this figure). Under these conditions, the motor phase winding connections $A_1$ and $B_1$ are at high voltages because the driving flip-flops have earlier caused excitation of phase taps $A_1'$ and $B_1'$ (FIGURE 4), and the motor rotor is in a 1st step (FIGURE 2). The incoming pulse P, designating a desired counterclockwise motor step, should change the excitation in motor phases B only, and the FIGURE 5 circuitry explains that this will occur. Reference to this circuitry reveals that only "And" unit 18a can effect an increase in the voltage of the common junction 18A from the zero level, this increased voltage being passed through the "disconnect" diode 43 to the common junction. Each of the "And" units, 18 and 17, is associated with such a disconnect diode (43–43c and 44–44c) these constituting intermediate "OR" arrays between the banks of "And" units and the gated amplifiers 23b and 24b which follow. The corresponding "OR" units in the functional block diagram of FIGURE 3 are identified by the reference characters 43′ and 44′. As is well known, any one of the "And" units which witnesses at least one low level of input will be incapable of impressing a high voltage (5 volts in the example under discussion) upon the junctions (18A or 17A) which in turn control the gated amplifiers. Under the excitation conditions portrayed in FIGURE 5, none of the "And" units in bank 17 can effect this increase in voltage, but "And" unit 18a does so in bank 18 and thereby tends to develop a negative triggering pulse output from the transistor 45 of gated amplifier 24b when a pulse occurs at G. Transistor 45 is normally biased negatively, but this biasing is raised to occasion an output pulse when both diodes D and $D_1$ have positive signals applied to their cathodes. These diodes form the "And" or coincidence unit 21, which "gates" the biasing of transistor 45 by raising it only when inputs appear simultaneously from the "And" bank 18 and from the gating line G. The latter input, derived from the pulse-shaper 16d (FIGURES 1 and 1A), is of a highly sharpened form which insures that the output of the gated amplifier stages will likewise be sharp rather than erratic or irregular, all as has been noted earlier herein. In the specific stepping situation under discussion, the resulting negative pulse from gated amplifier 24b is applied to monostable multivibrator 24a and triggers it to develop a single pulse which reverses the state of the bistable flip-flop circuitry 19B (FIGURE 4). The "single-shot" operation of multivibrators 24a and 23a is advantageous in that it affords immunity from effects of spurious signals which might otherwise reach the flip-flops 19A and 19B. Once a multivibrator cycle commences, it cannot be altered, and the multivibrator cannot then respond erroneously to either a sustained input or to subsequent false pulses or pulse irregularities. In practice, this has the important effect of preventing operation of the stepping motor at a multiple of the proper speed. Flip-flops 19A and 19B, as well as the associated amplifiers 32–35, are of known constructions in the art. At the instant when the system input pulse under discussion reached the logic circuitry, amplifier 34 maintained excitation of motor phase connection $B_1'$; however, the ultimate change effected in the system is the interruption of that excitation and an alternate excitation of motor phase connection $B_2'$ by the companion phase B amplifier 35. Thereupon, the rotor 9A of stepping motor 9 is moved counterclockwise by one predetermined angular increment or step, such that it is in a 4th step (FIGURE 2) in which the $A_1$ and $B_2$ parts of its phase windings are excited. For each succeeding input command pulse appearing across lines 14, the circuitry operates in comparable fashion to decide how the motor excitations must be altered to insure that but a single step is taken in the proper direction. Should an erroneous step somehow develop, the next-succeeding step will be made properly, and with regard for the fact that the motor is in that particular stepping condition, such that the system is never confused and errors cannot be accumulated. The logic circuitry operates to make such a decision in response to each and every input pulse.

Although the improved logic network 15 is readily devised using two banks of "And" units, 17 and 18, it is also found that the same functions may be served advantageously by a network involving fewer components, the reduction being made possible by the FIGURE 6 circuitry through use of tunnel diodes. These tunnel diodes, 46 and 47, appear in the phases B logic section 15b' and in the phases A logic section 15a', which corresponds in function to the logic sections 15b and 15a, respectively, in FIGURE 1 and may be substituted therefor. (It is a known characteristic of these tunnel diodes that they will pass a predetermined high level of current when the voltages impressed across them are either within a predetermined narrow range of relatively low voltages or, alternatively, are beyond a predetermined higher level of voltages. At an intermediate voltage level, they pass a significantly lower current.) This characterisic enables the tunnel diode to pass current of a first distinctive level when either one or an additive combination of three equal input voltages is impressed, whereas it cannot pass as much current when the impressed voltage is either zero or equal to an additive combination of two of the three input voltages. In the FIGURE 6 circuitry, these discriminations allow the two tunnel diodes to effect the very same logical operations as the banks of "And" units in FIGURES 3 and 5, there being but four inputs to each of the two logic sections 15b' and 15a'. The inputs to logic section 15b' are $A_1$, $B_1$ P and G, while those to logic section 15a' are $A_2$, $B_2$, N and G, only the gating inputs G, being the same. Diodes 48–53 pass only input signals of the desired positive polarity, and the respective section inputs are summed across resistances 54 and 55 for application to the respective tunnel diodes. In turn, the large or small currents passed by the tunnel diodes will develop biasing voltages, across load resistances 56 and 57, which are either high or low (or zero). Transistor 58 in the gating amplifier network of logic section 15b' is functionally comparable to transistor 45 in the circuitry of FIGURE 5, and it is normally biased to deliver no output pulse along the output line 59 unless the aforementioned gating signal G is witnessed at its input at the same time as either one or three of the signals $A_1$, $B_1$ and P excites the tunnel diode 46. These output pulses are delivered to the monostable multivibrator 24a (FIGURE 4) for the same purposes and in the same manner as described with reference to the pulses from gated amplifier 24b (FIGURE 4). The corresponding gated amplifier for logic section 15a' is omitted from the schematic drawing in FIGURE 6, although it will of course be understood that this is simply a duplicate of that shown with transistor 58.

Because each of the tunnel diodes tends to occasion an output pulse from its logic section when either one or all three of the inputs to it are high, it will be seen that the control logic is precisely in agreement with that called for by the table in FIGURE 2. By way of example, if it be assumed that the system stepping motor is in a 4th step (FIGURE 2), its winding excitations are at phase connections $A_1$ and $B_2$. Both logic sections 15a' and 15b' are then conditioned to produce an output pulse, except that this result cannot accrue until a gating pulse G is also received in each logic section. However, the gating pulses can occur only in response to either a P or N input pulse, and the appearance of either of these input pulses then also affects the conditioning of the two tunnel diodes. A P input pulse appearing while the stepping motor is in a 4th step causes tunnel diode 46 in logic section 15b' to witness two inputs ($A_1$ and P) while tunnel diode 47 witnesses but one input ($B_2$), such that only the latter section tends to produce an output pulse when the gating pulse G appears. The result is a change in excitation of motor phases A, only, and the motor then moves counterclockwise to a 3rd step (excitations $A_2$ and $B_2$, FIGURE 2). A further P pulse input can then cause only the desired change in excitation of motor phases B, there being but a single input (P) to the tunnel diode of logic section 15b' while two inputs ($A_2$ and $B_2$) are applied to logic section 15a'. The symbolic logic for the tunnel diode sections 15b' (Y) and 15a' ($\overline{Y}$) proves to be the same as for the network of FIGURES 3 and 5:

$$Y = A_1B_1P + A_2B_2P + A_1B_2N + A_2B_1N$$

and $$\overline{Y} = A_2B_2N + A_1B_1N + A_2B_1P + A_1B_2P$$

The circuitry presented in FIGURE 7 involves an alternative four-wire motor wiring arrangement with which the teachings of this invention may also be practised. Trigger circuits 24' and 23' (corresponding to circuits 24 and 23 in FIGURE 1) respond to the logic outputs Y and $\overline{Y}$ by alternately producing an output pulse in different ones of their two output leads. Each of the two motor phase windings, $60_A$ and $60_B$, associated with rotor 60 is coupled for electrical excitations of one or the opposite polarity, as required for the desired stepping, in accordance with reversals in the outputs of the associated flip-flop trigger circuits 24' and 23'. By way of example, a positive output signal in output line $24_{A2}$ biases transistor 61 to conduct and apply a positive signal to terminal $A_2$ of winding $60_A$, the transistor 62 likewise being biased to complete the circuit to ground. When the output of circuit 24' is reversed, the positive output signal appears in lead 24$_{A1}$ instead, and transistors 63 and 64 are thereby biased to conduct and to apply a positive signal at terminal A$_1$ while returning winding 60$_A$ to ground through transistor 64. The excitations of winding 60$_B$ are alternated via similar circuitry. Other wiring connections for stepping motors may be exploited also, where the same or equivalent motor phase reversals and changes in motor feedback signals can be realized.

The FIGURE 8 circuitry characterizes an advantageous stepping motor control arrangement which involves silicon controlled rectifiers. There, the stepping motor 65 is like that depicted in FIGURES 1 and 4 and possesses a rotor 66 and two field windings 67 and 68. Each of these field windings is preferably of the bifilar type, with the central junctions being energized in common from the positive terminal 69 of a suitable D.C. power source. Ends A$_1$' and A$_2$' of the phase A winding, 67, lettered to conform with the lettering of corresponding ends of the phase A winding in FIGURE 4, are switched in their excitations by the groundings achieved through the respective silicon controlled rectifiers 70 and 71. These semiconductor devices are switched by signals applied to their gate electrodes from gate circuitry 72, the latter comprising transistorized flip-flop circuitry which is of a known type which will respond to the pulse output of a monostable multivibrator (i.e., one-shot multivibrator) appearing in input line 73. The halves of phases B winding, 68, are similarly excited in a precisely-regulated manner by the associated silicon controlled rectifiers 74 and 75, these being triggered by the outputs of the gate circuitry 76 which responds to the pulses applied to its input line 77 by the monostable multivibrator associated with phases B. Logic circuit connections A$_1$, A$_2$, B$_1$ and B$_2$ are made in a manner comparable to that taught in connection with the FIGURE 4 system, and the monostable multivibrator outputs are derived in the same manner and for the same purposes. As is well known, the silicon controlled rectifier is a solid-state semiconductor device which has operating characteristics analogous to those of a thyratron, each such silicon controlled rectifier (SCR) having an anode, cathode and gate electrode connection. Commutating capacitors 78 and 79 are connected between the anode electrodes of each pair of SCR's, and the motor field windings are protectively shunted by diodes to suppress erroneous feedback to the input of the logic network (not shown in FIGURE 8). SCR turn-off time under power loading conditions may be held to exceptionally short periods, such as about 12 microseconds.

Digital actuator operation in accordance with this invention may conveniently be powered by storage batteries, inasmuch as the switched motor winding excitations are D.-C.; this can be of particular advantage where the motor is in a remote location or where emergency power is needed. Although tunnel diodes have been described in connection with the simplified logic circuitry of FIGURE 6, it should be understood that other equivalent devices, having a like negative resistance characteristic for these purposes, may also be adapted to similar uses. And, although the input connections to the improved digital actuators have been shown to be of the two-wire type, one being ground, alternative three-wire inputs may of course be exploited in some cases, a signal on one or the other of the two ungrounded wires causing the motor to step forward or backward, respectively.

The preferred embodiments which have been illustrated and referred to have been submitted for purposes of description rather than limitation, and those skilled in the art will understand that various modifications and substitutions may be effected without departing either in spirit or scope from this invention in its broadest aspects.

What I claim as new and desire to secure by Letters Patent of the United States is:

1. Digital actuator apparatus comprising an electrically-excited motive device for producing a mechanical output movement of predetermined magnitude in one of two possible directions responsive to each change in electrical excitation thereof, said motive device producing movements in the two directions responsive to electrical excitations thereof in accordance with a predetermined repetitive sequence, controller means producing two different control signals to command output movements of said predetermined magnitude from said motive device in different directions, logic circuit means for changing the electrical excitations of said motive device responsive to each occurrence of said control signals, and means applying to said logic circuit means electrical input signals characterizing both said control signals and the state of the electrical excitations in the sequence of said electrical excitations of said motive device, said logic circuit means being wired to respond to said electrical input signals with changes in said electrical excitations according to said predetermined repetitive sequence.

2. Digital actuator apparatus comprising an electrically-excited motive device for producing a predetermined mechanical output movement in different directions responsive to each change in electrical excitation thereof, said motive device producing movements in said different directions responsive to electrical excitations thereof in accordance with a predetermined repetitive sequence, means producing different control signals to command said output movements from said motive device in said different directions, logic circuit means for changing the electrical excitations of said motive device responsive to each occurrence of said control signals, and means applying to said logic circuit means electrical input signals characterizing both said different control signals and the state of the electrical excitations in the sequence of said electrical excitations of said motive device, said logic circuit means including a plurality of logic sections each producing a different electrical excitation of said motive device and each wired to respond to said electrical input signals with changes in said electrical excitations according to said predetermined repetitive sequence.

3. Digital actuator apparatus comprising an electrical stepping motor for producing a predetermined angular output movement responsive to each change in electrical excitation in each of two phase winding portions thereof, said stepping motor producing output movements in said different directions responsive to electrical excitations of said phase winding portions in accordance with a predetermined repetitive sequence, controller means producing two different control signals to command said output movements in said different directions, logic circuit means for changing the electrical excitations of said phase winding portions responsive to each occurrence of either of said control signals, and means applying to said logic circuit means electrical input signals characterizing both said different control signals and the electrical excitations of said phase winding portions, said logic circuit means including two logic sections each producing different electrical excitations of a different one of said phase winding portions and both wired to respond to said electrical input signals with changes in said electrical excitations according to said predetermined repetitive sequence.

4. Digital actuator apparatus comprising a two-phase reversible electrical stepping motor, said stepping motor producing incremental angular output movements in different directions responsive to electrical excitations of different phases thereof in accordance with a predetermined repetitive sequence of four steps, controller means producing two different control signals to command said angular output movements in said different directions, logic circuit means for changing the electrical excitation in one of the different phases of said motor responsive to each occurrence of said control signals, said logic circuit means including two logic sections each electrically excitable to change the electrical excitations in a different one of the two phases of said stepping motor, and means applying to said logic sections input signals characterizing both of said different control signals and the electrical excitations of said two phases of said stepping motor, said logic sections responding to said input signals to change said electrical excitations in accordance with said predetermined repetitive sequence.

5. Digital actuator apparatus comprising a two-phase reversible electrical stepping motor producing incremental angular output movements in different directions responsive to electrical excitations of different phases thereof in accordance with a predetermined repetitive sequence of four steps wherein each successive step involves an electrical reversal in one of the two motor phases, controller means producing two different control signals to command said angular output movements in said different directions, logic circuit means for changing the electrical excitation in one of the different phases of said motor responsive to each occurrence of said control signals, said logic circuit means including two logic sections each electrically excitable to change the electrical excitation in a different one of the two phases of said stepping motor, and means for applying to said logic sections six input signals, two of which characterize the different control signals and four of which characterize the electrical excitations of said two phases of said stepping motor, said logic sections responding to said six input signals to change said electrical excitations in accordance with said predetermined repetitive sequence.

6. Digital actuator apparatus comprising an electrically-excited motive device for producing incremental output movements in different directions each responsive to a change in electrical excitations thereof in accordance with a predetermined repetitive sequence, controller means producing different control signals to command said output movements in said different directions, logic circuit means for changing the electrical excitations of said motive device responsive to each occurrence of said control signals, means for applying to said logic circuit means input signals which characterize both the different control signals and the electrical excitations of said motive device, said logic circuit means responding to said input signals to change said electrical excitations in accordance with said predetermined repetitive sequence, said logic circuit means including electrical gating means normally inhibiting changes in said electrical excitations by said logic circuit means, and means applying an electrical gating signal to said gating means responsive to each occurrence of a control signal from said controller means.

7. Digital actuator apparatus comprising a two-phase reversible electrical stepping motor producing incremental angular output movements in different directions responsive to unidirectional electrical excitations of different phases thereof in accordance with a predetermined repetitive sequence of four steps wherein each successive step involves an electrical reversal of the polarity of magnetic field produced in one of the two motor phases, controller means producing control pulses of two different polarities to command said angular output movements in said different directions, logic circuit means for changing the electrical excitation in one of the different phases of said motor responsive to each occurrence of a different one of said control pulses, said logic circuit means including two logic sections each electrically excitable to change the electrical excitation in a different one of the two phases of said stepping motor, and means for applying to said logic sections six input signals, two of which are in pulse form characterizing the different control signals and four of which characterize the unidirectional electrical excitations of said two phases of said stepping motor, said logic sections responding to said six input signals to change said electrical excitations in accordance with said predetermined repetitive sequence.

8. Digital actuator apparatus as set forth in claim 7 wherein said logic sections each include electrical gating means normally inhibiting changes in said electrical excitations by said logic sections, and means applying an electrical gating pulse of one polarity to said gating means in both of said logic sections responsive to each occurrence of a control pulse from said controller means.

9. Digital actuator apparatus comprising a two-phase reversible electrical stepping motor producing incremental angular output movement in different directions responsive to unidirectional electrical excitations of different phases thereof in accordance with a predetermined repetitive sequence of four steps wherein each successive step involves an electrical reversal of the polarity of magnetic field produced in one of the two motor phases, controller means producing two control signals of different polarities to command said angular output movements in said different directions, said controller means including means for selectably producing sustained unidirectional signals of either of said polarities as said control signals, logic circuit means for changing the electrical excitation in one of the different phases of said motor responsive to each different occurrence of said control signals, said logic circuit means including two logic sections each electrically excitable to change the electrical excitation in a different one of the two phases of said stepping motor, means for applying to said logic sections six inputs signals, two of which characterize the different polarities of said control signals and four of which characterize the unidirectional electrical excitations of said two phases of said stepping motor, said logic sections responding to said six input signals to change said electrical excitations in accordance with said predetermined repetitive sequence, generator means producing a train of gating pulses having a predetermined repetition rate, said logic sections each including electrical gating means normally inhibiting changes in said electrical excitations by said logic sections, means for selectably applying an electrical gating signal to said gating means in both of said logic sections responsive to each occurrence of a control signal from said controller means, and means for selectably applying said train of gating pulses to said gating means when said controller means produces said sustained unidirectional signals.

10. Digital actuator apparatus comprising a two-phase reversible electrical stepping motor producing incremental angular output movements in different directions responsive to unidirectional electrical excitations of different phases thereof in accordance with a predetermined repetitive sequence of four steps wherein each successive step involves an electrical reversal in one of the two motor phases, controller means producing two different control signals to command said angular output movements in said different directions, logic circuit means for changing the electrical excitation in one of the different phases of said motor responsive to each occurrence of said control signals, said logic circuit means including two logic sections each electrically excitable to produce a different electrical output signal to change the electrical excitation in a different one of the two phases of said stepping motor, and means for applying to said logic sections six input signals, two of which characterize the different control signals and four of which characterize the electrical excitations of said two phases of said stepping motor, said logic sections responding to said six input signals to change said electrical excitations in accordance with said predetermined repetitive sequence by producing said output signals which satisfy the Boolean functions of symbolic logic as follows:

$$Y = A_1B_1P + A_2B_2P + A_1B_2N + A_2B_1N$$
$$\overline{Y} = A_2B_2N + A_1B_1N + A_2B_1P + A_1B_2P$$

where Y and $\overline{Y}$ represent said different output signals from said two logic sections, P and N represent the two input signals characterizing said different control signals, $A_1$ and $A_2$ represent two of the four input signals characterizing the electrical excitations of one of said two phases of said motor, and $B_1$ and $B_2$ represent two of the four input signals characterizing the instantaneous electrical excitations of the other of said two phases of said motor.

11. Digital actuator apparatus as set forth in claim 10 wherein said stepping motor includes electronic switching means controlling the electrical excitations of each of said different phases, and further including different single-shot multivibrator means each responsive to a different one of said output signals Y and $\overline{Y}$ to produce pulses of predetermined duration, and means actuating said electronic switching means with said pulses from said multivibrator means.

12. Digital actuator apparatus as set forth in claim 11 wherein said logic sections each include electrical gating means normally inhibiting the production of said output signals by said logic sections, and means applying an electrical gating pulse to said gating means in both of said logic sections responsive to each occurrence of a control signal from said controller means, whereby successive signals in the outputs of said logic sections are ineffective to actuate said switching means unless separated in time by more than said predetermined duration.

13. Digital actuator apparatus comprising a two-phase reversible electrical stepping motor producing incremental angular output movements in different directions responsive to switched unidirectional electrical excitations of windings in the different phases thereof in accordance with a predetermined repetitive sequence of four switching steps wherein each successive step involves a reversal in the magnetic field of the windings of one of the two motor phases, controller means producing two different control signals to command said angular output movements in said different directions, logic circuit means for changing the electrical excitation in one of the different phases of said motor responsive to each occurrence of said control signals, said logic circuit means including two logic sections each electrically excitable to change the electrical excitation in a different one of the two phases of said stepping motor, means for applying to said logic sections six input signals, two of which characterize the different control signals and four of which characterize the instantaneous electrical excitations of said two phases of said stepping motor, said logic sections responding to said six input signals to change said electrical excitations in accordance with said predetermined repetitive sequence, and damping diode means connected in shunt relationship to said windings and polarized to by-pass signals induced in any of said windings upon switching of unidirectional excitation in another of said windings, whereby switching of said excitations of said windings does not cause any of said four input signals to falsely characterize the electrical excitations of said motor phases.

14. Digital actuator apparatus as set forth in claim 13 wherein each of said stepping motor phases includes a pair of bifilar windings, and wherein a different damping diode is connected in shunt relationship to each of said bifilar windings.

15. Digital actuator apparatus comprising a polyphase reversible electrical stepping motor producing incremental angular output movements in different directions responsive to unidirectional electrical excitations of different phases thereof in accordance with a predetermined repetitive sequence of steps wherein each successive step involves an electrical reversal in one of the motor phases, controller means producing two different control signals to command said angular output movements in said different directions, logic circuit means for changing the electrical excitation of said motor responsive to each occurrence of said control signals, said logic circuit means including logic sections each electrically excitable to produce a different electrical output signal to change the electrical excitation in a different one of the phases of said stepping motor, means for applying to said logic sections input signals which characterize the different control signals and which characterize the electrical excitations of said phases of said stepping motor, said logic sections responding to said input signals to change said electrical excitations in accordance with said predetermined repetitive sequence.

16. Digital actuator apparatus comprising a two-phase reversible electrical stepping motor producing incremental angular output movements in different directions responsive to unidirectional electrical excitations of different phases thereof in accordance with a predetermined repetitive sequence of four steps wherein each successive step involves an electrical reversal in one of the two motor phases, controller means producing two different control signals to command said angular output movements in said different directions, logic circuit means for changing the electrical excitation in one of the dfferent phases of said motor responsive to each occurrence of said control signals, said logic circuit means including two logic sections each electrically excitable to produce a different electrical output signal to change the electrical excitation in a different one of the two phases of said stepping motor, means for applying to said logic sections input signals which characterize the different control signals and which characterize the electrical excitations of said two phases of said stepping motor, said logic sections each including a different group of "And" circuits, and means applying to each of said "And" circuits in both groups of "And" circuits a different combination of said input signals, said logic sections responding to the outputs from said groups of "And" circuits to change said electrical excitations in accordance with said predetermined repetitive sequence.

17. Digital actuator apparatus comprising a two-phase reversible electrical stepping motor producing incremental angular output movements in different directions responsive to unidirectional electrical excitations of different phases thereof in accordance with a predetermined repetitive sequence of four steps wherein each successive step involves an electrical reversal in one of the two motor phases, controller means producing two different control signals to command said angular output movements in said different directions, logic circuit means for changing the electrical excitation in one of the different phases of said motor responsive to each occurrence of said control signals, said logic circuit means including two logic sections each electrically excitable to produce a different electrical output signal to change the electrical excitation in a different one of the two phases of said stepping motor, means for applying to said logic sections six input signals, two of which characterize the different control signals and four of which characterize the electrical excitations of said two phases of said stepping motor, said logic sections each including a different group of four "And" circuits, and means applying to each of said "And" circuits a different combination of three of said input signals, said logic sections responding to the outputs from said groups of "And" circuits to change said electrical excitations in accordance with said predetermined repetitive sequence.

18. Digital actuator apparatus as set forth in claim 17 wherein said different control signals from said controller are unidirectional signals of different polarity, and further including isolator means responsive to said control signals producing said two of said input signals therefrom in one polarity on different electrical lines, said four of said input signals having the same polarity as said one polarity when characterizing excitation of the motor phases.

19. Digital actuator apparatus comprising a two-phase reversible electrical stepping motor producing incremental angular output movements in different directions responsive to unidirectional electrical excitations of different phases thereof in accordance with a predetermined repetitive sequence of four steps wherein each successive step involves an electrical reversal in one of the two motor phases, controller means producing two different control signals to command said angular output movements in said different directions, logic circuit means for changing the electrical excitation in one of the different phases of said motor responsive to each occurrence of said control signals, said logic circuit means including two logic sections each electrically excitable to produce a different electrical output signal to change the electrical excitation in a different one of the two phases of said stepping motor, means for applying to said logic sections input signals which characterize the different control signals and which characterize the electrical excitations of said two phases of said stepping motor, said logic sections each including tunnel diode means producing one level of output for certain combinations of input and another level of output for other combinations of input thereto, and means applying to each of said tunnel diode means different ones of said input signals, said logic sections responding to said one level of outputs from said tunnel diode means to change said electrical excitations in accordance with said predetermined repetitive sequence.

20. Digital actuator apparatus comprising a two-phase reversible electrical stepping motor producing incremental angular output movements in different directions responsive to unidirectional electrical excitations of different phases thereof in accordance with a predetermined repetitive sequence of four steps wherein each successive step involves an electrical reversal in one of the two motor phases, controller means producing two different control signals to command said angular output movements in said different directions, logic circuit means for changing the electrical excitation in one of the different phases of said motor responsive to each occurrence of said control signals, said logic circuit means including two logic sections each electrically excitable to produce a different electrical output signal to change the electrical excitation in a different one of the two phases of said stepping motor, means for applying to said logic sections six input signals, two of which characterize the different control signals and four of which characterize the electrical excitations of said two phases of said stepping motor, said logic sections each including a different negative resistance device having a first level of output for inputs equal to one or the sum of three of said input signals and having another level of output for other inputs, and means applying three different ones of said input signals to each of said negative resistance devices in accordance with the Boolean expressions of symbolic logic as follows:

$$Y = A_1 B_1 P + A_2 B_2 P + A_1 B_2 N + A_2 B_1 N$$
$$\overline{Y} = A_2 B_2 N + A_1 B_1 N + A_2 B_1 P + A_1 B_2 P$$

where $Y$ and $\overline{Y}$ represent the output signals from the two logic sections, $P$ and $N$ represent said two input signals characterizing said control signals $A_1$ and $A_2$ represent two of said four input signals which characterize the electrical excitations in one of said phases of said stepping motor, and $B_1$ and $B_2$ represent two of said four input signals which characterize the electrical excitations in the other of said phases of said stepping motor.

References Cited by the Examiner

UNITED STATES PATENTS

| | | | |
|---|---|---|---|
| 3,042,819 | 7/1962 | Kennedy | 310—49 |
| 3,105,927 | 10/1963 | Flatten et al. | 318—28 |
| 3,112,433 | 11/1963 | Fairbanks | 318—133 X |
| 3,117,268 | 1/1964 | Madsen | 310—49 X |
| 3,124,732 | 3/1964 | Dupy | 318—138 |
| 3,199,009 | 8/1965 | Lien et al. | 310—49 |
| 3,200,316 | 8/1965 | Engel | 318—138 |
| 3,219,895 | 11/1965 | Price | 318—28 |

ORIS L. RADER, *Primary Examiner.*

G. SIMMONS, *Assistant Examiner.*